(12) United States Patent
Mazzaferro et al.

(10) Patent No.: US 8,740,259 B2
(45) Date of Patent: Jun. 3, 2014

(54) INTERNALLY LINED PIPE CONNECTIONS AND RELATED METHODS OF MAKEUP

(75) Inventors: Gaston Mauro Mazzaferro, Campana (AR); Alejandra Paola Sanmartino, Campana (AR)

(73) Assignee: Tenaris Connections Limited, Kingstown (VC)

(*) Notice: Subject to any disclaimer, the term of this patent is extended or adjusted under 35 U.S.C. 154(b) by 182 days.

(21) Appl. No.: 13/019,709

(22) Filed: Feb. 2, 2011

(65) Prior Publication Data

US 2012/0193908 A1  Aug. 2, 2012

(51) Int. Cl.
*E21B 17/02* (2006.01)
*F16L 58/18* (2006.01)

(52) U.S. Cl.
USPC ............ 285/355; 285/55; 285/333; 285/383; 285/110

(58) Field of Classification Search
CPC ....... F16L 15/003; F16L 15/004; F16L 15/04; F16L 58/182; E21B 17/042; E21B 17/08
USPC .......... 285/333, 334, 355, 390, 383, 55, 110, 285/111
See application file for complete search history.

(56) References Cited

U.S. PATENT DOCUMENTS

| | | | | |
|---|---|---|---|---|
| 1,859,065 A * | 5/1932 | Anderson | | 285/107 |
| 2,233,734 A * | 3/1941 | Ely et al. | | 285/55 |
| 3,253,841 A * | 5/1966 | Ahmad | | 285/55 |
| 3,266,821 A * | 8/1966 | Safford | | 285/40 |
| 3,298,716 A * | 1/1967 | Taylor et al. | | 285/55 |
| 3,472,533 A * | 10/1969 | Turner | | 285/55 |
| 3,479,059 A * | 11/1969 | Taylor et al. | | 285/55 |
| 4,509,776 A * | 4/1985 | Yoshida et al. | | 285/55 |
| 4,856,828 A * | 8/1989 | Kessler et al. | | 285/334.1 |
| 4,875,713 A * | 10/1989 | Carstensen | | 285/55 |
| 5,069,485 A * | 12/1991 | Allen et al. | | 285/55 |
| 5,779,276 A * | 7/1998 | Allen | | 285/55 |
| 6,312,024 B1 | 11/2001 | Dutilleul et al. | | |
| 7,360,797 B2 | 4/2008 | Posson | | |
| 2005/0173919 A1* | 8/2005 | Posson | | 285/55 |
| 2009/0167016 A1* | 7/2009 | Zapata et al. | | 285/55 |
| 2009/0295146 A1* | 12/2009 | Zapata | | 285/55 |

FOREIGN PATENT DOCUMENTS

WO  98/37350 A1  8/1998

* cited by examiner

*Primary Examiner* — James Hewitt
(74) *Attorney, Agent, or Firm* — Osha Liang LLP

(57) ABSTRACT

A threaded connection includes a first pipe having an internal liner and a first pin end on a distal end thereof, the first pin end comprising a first annular seal permanently affixed therein, a second pipe having an internal liner and a second pin end on a distal end thereof, the second pin end comprising a second annular seal permanently affixed therein, a coupling having a first and second box end. The first pin end and the first box end, and the second pin end and the second box end are threadedly are threadedly engaged and a mating surface of the first annular seal is configured to contact a mating surface of the second annular seal and provide a continuous internal seal along an axial length of the threaded connection.

17 Claims, 2 Drawing Sheets

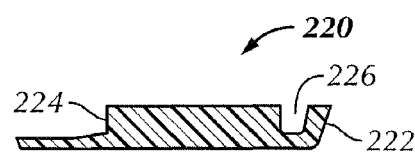
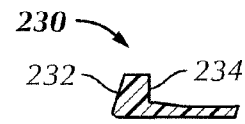
FIG. 5
FIG. 6
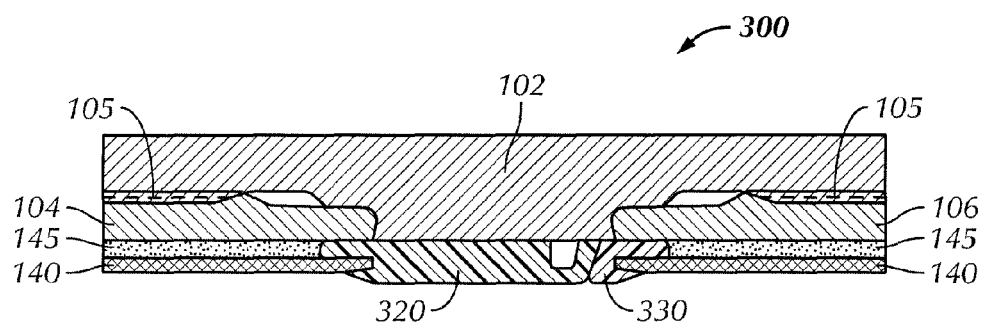
FIG. 7
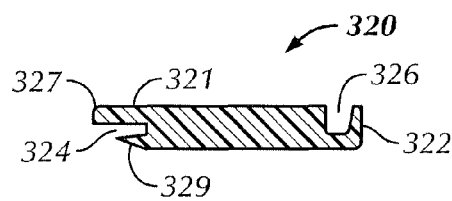
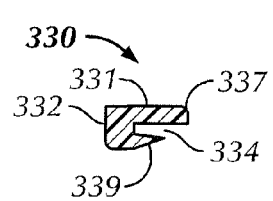
FIG. 8
FIG. 9

INTERNALLY LINED PIPE CONNECTIONS AND RELATED METHODS OF MAKEUP

BACKGROUND

1. Field of the Disclosure

Embodiments disclosed herein relate generally to downhole tubulars. More particularly, embodiments disclosed herein relate to internally lined tubular connections and related methods of assembling internally lined tubular connections.

2. Background Art

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, welded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation). The seals may be elastomeric (e.g., an o-ring seal), thread seals, metal-to-metal seals, or any other seals known to one of ordinary skill in the art.

It should be understood that certain terms are used herein as they would be conventionally understood, particularly where threaded tubular joints are connected in a vertical position along their central axes such as when making up a pipe string for lowering into a well bore. Typically, in a male-female threaded tubular connection, the male component of the connection is referred to as a "pin" member and the female component is called a "box" member. As used herein, "make-up" refers to engaging a pin member into a box member and threading the members together through torque and rotation.

Many downhole oil production operations may be conducted in highly corrosive environments resulting from production and/or re-injection of hydrocarbons and formation containing salts and gases, such as hydrogen sulphide and/or carbon dioxide, which may pass through the pipe interior. To provide a useful life to the pipes used in such environments, corrosion resistant liners (e.g., fiberglass liners) may be installed within each pipe before the pipe is made-up into a downhole string. Threaded and coupled ("T&C") connections may be required to connect the pipe in an end to end relationship and to provide a continuity of the internal liner in the coupled joint, such that protection along a full length of the string (including the pipes and joints) against internal corrosion may be provided. Currently, threaded and coupled connections used with internally lined pipe require special modifications and/or affect the structural integrity of the pipe.

Accordingly, there exists a need for an internally lined pipe connection that is adaptable to a standard connection such that pipe lengths may be installed without substantial modification to the connection and without affecting a structural integrity of the pipe connection.

SUMMARY OF THE DISCLOSURE

In one aspect, embodiments disclosed herein relate to a threaded connection including a first pipe having an internal liner and a first pin end on a distal end thereof, the first pin end comprising a first annular seal permanently affixed therein, a second pipe having an internal liner and a second pin end on a distal end thereof, the second pin end comprising a second annular seal permanently affixed therein, a coupling having a first and second box end. The first pin end and the first box end, and the second pin end and the second box end are threadedly are threadedly engaged and a mating surface of the first annular seal is configured to contact a mating surface of the second annular seal and provide a continuous internal seal along an axial length of the threaded connection.

In other aspects, embodiments disclosed herein relate to a method of assembling a threaded connection, the method including providing a first pipe having an internal liner and a first pin on a distal end thereof, the first pin end comprising a first annular seal permanently affixed therein, providing a second pipe having an internal liner and a second pin end on a distal end thereof, the second pin end comprising a second annular seal permanently affixed therein, providing a coupling comprising first and second box ends, threadedly engaging the first pin end with the first box end, and the second pin end with the second box end, and contacting a mating surface of the first annular seal with a mating surface of the second annular seal.

Other aspects and advantages of the invention will be apparent from the following description and the appended claims.

BRIEF DESCRIPTION OF DRAWINGS

FIGS. 4-6 show cross-section views of a lined pipe connection in accordance with one or more alternate embodiments of the present disclosure.

FIGS. 7-9 show cross-section views of a lined pipe connection in accordance with one or more alternate embodiments of the present disclosure.

DETAILED DESCRIPTION

Figure 1:
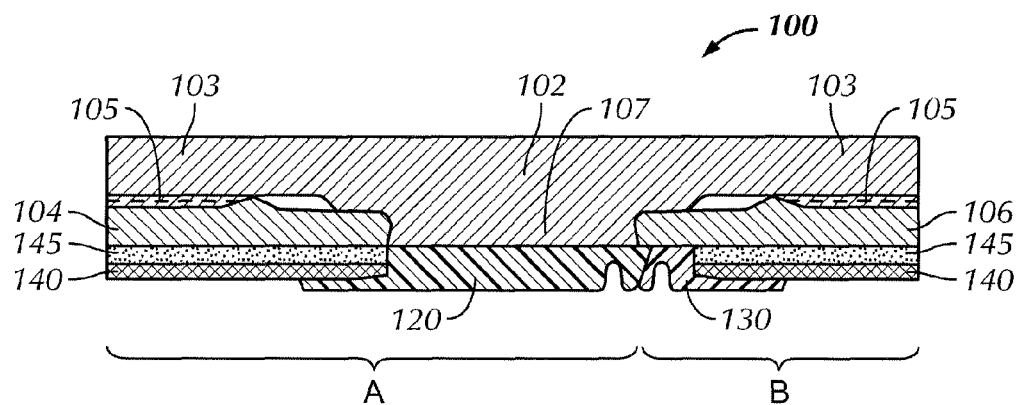
FIGS. 1-3 show cross-section views of a lined pipe connection in accordance with one or more embodiments of the present disclosure.
Figure 2:
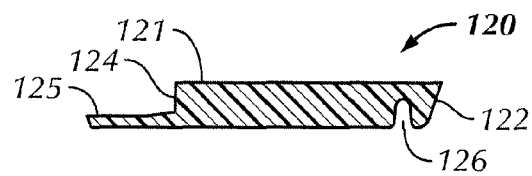
Figure 3:
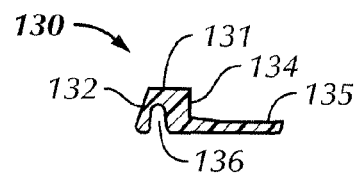

In one aspect, embodiments disclosed herein relate to an internally lined pipe connection and related methods of assembly. Referring initially to FIGS. 1-3, cross-section views of an internally lined pipe connection 100 in accordance with one or more embodiments of the present disclosure are shown. The pipe connection 100 includes a standard pipe coupling 102 into which pin members 104 and 106 may be threadedly engaged by corresponding external and internal threaded sections 105. The standard pipe coupling 102 may be a standard steel coupling having box ends 103 on both ends and a central portion 107 against which ends of the pin members 104 and 106 may abut. The corresponding threaded portions may be free-running or wedge threads as understood by those skilled in the art.

Further, the pipe lengths (not shown) on ends of which pin members 104 and 106 are disposed on both ends may include internal liners running a full length of the pipe and configured to form a corrosion resistant inner surface therein. In certain embodiments, the internal liners may include a mortar or epoxy binder 145 over which a liner 140 may be disposed. In certain embodiments, the liner 140 may be a fiberglass liner. In other embodiments, liner materials used may include, but are not limited to, polyproplylene, fluoropolymers, and polyethylene.

The pipe connection 100 further includes two annular seals, a first seal 120 and a second seal 130, configured to be disposed within the connection 100. In certain embodiments, first and second seals 120 and 130 may be a fiber-reinforced polymer material, including, but not limited to, polypropylene, fluoropolymers, polyethylene, and other materials known to those skilled in the art, including metallic alloys. In certain embodiments, the seals may be the same material as the liner 140, or alternatively, different materials. First and second seals 120 and 130 are configured to be disposed between opposing ends of the pin members 104 and 106 and inside the standard coupling 102. As positioned, first and second seals 120 and 130 may be configured to provide a continuous internal liner along an axial length of the connection, the continuous internal liner beginning with the liner 140 of pin member 104, continuing axially along the coupling 102 with first and second seals 120 and 130, and extending to the liner 140 of the next pin member 106.

As shown in FIG. 2, first seal 120 may be formed having a planar annular section 121 that is configured to contact with an inner surface of the coupling 102. First seal 120 also has an annular back portion 124 that is configured to position the first seal 120 and that mates with a similar annular surface provided in the end of the liner 140 in the pin member 104. Finally, first seal 120 has an end surface 125 configured to mate with an inner surface of the liner 140 in pin member 104.

Similarly, as shown in FIG. 3, second seal 130 is formed having a planar annular section 131 that is configured to be fixed to an inner surface of the pin member 106. Second seal 130 further has an annular back portion 134 that is configured to position the second seal 130 and that mates with a similar annular surface provided in the end of the liner 140 of the pin member 106. Finally, the second seal 130 has an end surface 135 configured to mate with an inner surface of the liner 140 in pin member 106.

Figure 4:
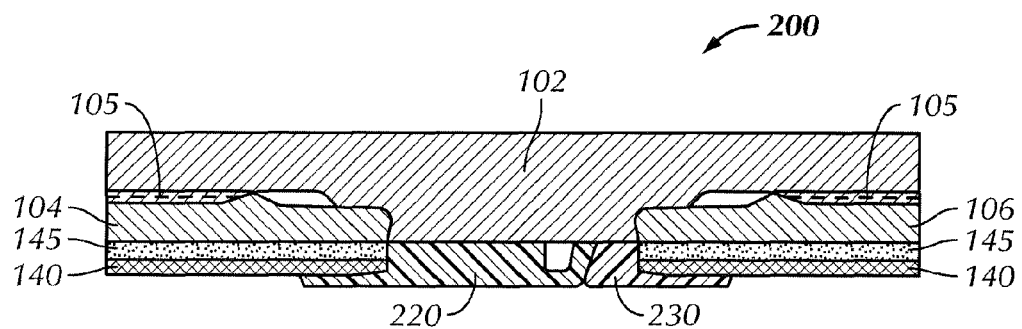

Further, the first and second seals 120 and 130 may include annular grooves 126 and 136, respectively, located on an inner diameter of the seals and configured to provide a spring effect (i.e., allow the seals to axially compress under a load parallel to a central axis of the connection). Annular grooves 126 and 136 may be formed having two opposed flat surfaces, with a radius or flat surface at the root of the groove. An angle formed between the opposed flat surfaces may be between about 10 and 80 degrees. Annular grooves may have a depth of between about 10% and about 90% of the seal's radial thickness. In certain embodiments, there may be more than one annular groove in each seal 120, 130 arranged along an axial length of the seal. The opposed flat surfaces of the grooves may be configured to face an interior of the pipe for the groove to receive fluid pressure and energize the seal (i.e., a pressure energized mechanism). The spring effect provided by the seals may aid in assuring the seal ability of the connection, providing a corrosion barrier, absorbing axial dimensional tolerances during make-up, and maintaining the connection over several make and break operations. As shown in FIGS. 4-6, in certain embodiments, only the first seal 220 may have an annular groove 226 formed therein.

The first and second seals 120 and 130 are formed having mating surfaces 122 and 132, respectively at which the seals are configured to engage one another. The seals 120 and 130 may be formed having angled mating surfaces (i.e., angled with respect to a plane perpendicular to a central axis of the connection). In certain embodiments, the angled mating surfaces may be between about 10 degrees and 90 degrees relative to a plane perpendicular to a central axis of the connection. In certain embodiments, the mating surfaces 122 and 132 may be formed perpendicular to a central axis of the connection. In other embodiments, the mating surfaces 122 and 132 may be more complex surfaces (other than flat), including, but not limited to, saw-tooth, sinusoidal, or other known surfaces known to those skilled in the art.

Referring briefly to FIGS. 7-9, in alternate embodiments, the annular back portions 324 and 334 of the seals 320 and 330, respectively, may be modified having a horizontal groove (with substantially the same thickness of the liner) that divides the back portion into two different sections. A first section 327 and 337 of the back portions 324 and 334 of the first and second seals 320 and 330, respectively, is inserted in the mortar/epoxy 145 (or other adhesive material used to secure the liner 140) in an annular section formed between an internal diameter of the pipe and an external diameter of the liner 140. A second section 329 and 339 of the back portions 324 and 334 of the first and second seals 320 and 330, respectively, having a tapered surface is configured to engage an inner surface of the liner 140 and join the seal with the internal diameter of the liner. Including the horizontal groove and dividing the annular back portions 324 and 334 may provide a better ability to centralize the liner 140.

Methods of assembling connections in accordance with one or more embodiments of the present disclosure include providing a standard coupling and standard pipe lengths having pin ends. The pipe may have an internal liner installed therein, which runs a full length of the pipe. Installation includes inserting the liner into the pipe, and subsequently pumping a mortar, epoxy, or other adhesive into the annulus between the liner and the steel pipe to secure the liner to a full length of the inner surface of the pipe. In alternate embodiments, a liner may be pre-stretched in an axial direction (i.e., the pre-stretched liner is slightly longer than the pipe length) and then inserted into the pipe. The pre-stretched pipe may then be released (i.e., tension on either end of the liner is released), which will allow the liner to compress and increase in diameter slightly, which will self-lock (in which case adhesive may or may not be used) the liner within the pipe length due to interference with the pipe length (i.e., hoop tension).

For assembly purposes, and referring to FIG. 1, as used herein, a "mill side" of a pipe length, indicated at "A," refers to pin member 104, has the coupling 102 screwed on at the mill or manufacturing facility (essentially forming a box end), while a "field side" of a pipe length, indicated at "B," refers to pin member 106, which is screwed to the coupling during the running operation (i.e., in the field) (a pin end). As shown, the internal liner 140 may extend fully to a pin face (i.e., the end of the pipe) of the mill side pin end 104, while the internal liner 140 may stop a slight distance short of a pin face of the field side pin end 106, which leaves a small annular volume between an end of the internal liner 140 and an end of the pin end 106 in which the field side seal 130 may be installed. In certain embodiments, and as shown in FIG. 4, both liners may extend to the respective pin faces.

Methods of assembly at the mill or manufacturing facility include providing a first pipe having an internal liner and a box end on a distal end thereof, the box end comprising a first annular seal permanently affixed therein. Next, the method includes providing a second pipe having an internal liner and a pin end on a distal end thereof, the pin end comprising a second annular seal permanently affixed therein. Further, the method includes threadedly engaging the box end and the pin end, contacting a mating surface of the first annular seal with a mating surface of the second annular seal, and providing a continuous internal seal along an axial length of the threaded connection.

In other embodiments, methods of assembly at the mill or manufacturing facility may include providing a first internally lined pipe length, which may be coupled with the coupling 102 by threading pin end 104 into a first end of the coupling 102 and applying a specified torque. The specified torque may be the standard torque that is specified for a particular standard connection, which may be found in published connection catalogues, for example. Next, the first seal 120, which may now be referred to as the mill side seal for assembly purposes, may be inserted into the coupling 120 and fixed to the face and inner wall of the internal liner 140 in pin end 104 (which creates a barrier across the connection point between the coupling 102 and pin end 104). The planar annular section 121 of the mill side seal 120 may not be fixed to but only contacts an inner surface of the coupling 102, the annular back portion 124 of the mill side seal 120 is configured to position the seal 120 and mate with a similar annular surface provided in the end of the internal liner 140, and the end surface 125 of the mill side seal 120 is configured to mate with an inner surface of the internal liner 140 in pin member 104. The mill side seal 120 is configured to be permanently fixed to the liner 140 in pin end 104, thereby providing a corrosion barrier across the connection point between the coupling 102 and the pin end 104, starting at the internal liner 140 of the pin end 104 and extending axially along the first seal 120 into the coupling 102 up to mating surface 122 of first seal 120.

Further, internally lined pin member 106 may have the second seal 130, which may now be referred to as the field side seal, inserted into an end thereof. As previously described, the planar annular section 131 of the field side seal 130 is configured to be fixed to an inner surface of the pin member 106, the annular back portion 134 of the field side seal 130 is configured to position the seal 130 and mates with a similar annular surface provided in the end of the internal liner 140 of, and the end surface 135 of the field side seal 130 is configured to mate with an inner surface of the internal liner 140 in pin member 106. The field side seal 130 is likewise permanently fixed within the pin end 106 (but is nowhere fixed or attached to the coupling 102), thereby providing a continuous corrosion barrier from the internal liner 140 of the pin end 106 up to mating surface 132.

Methods of assembly in the field when attaching multiple manufactured pipe lengths (having first and second seals 120 and 130 installed as described above) together to form a pipe string include inserting a field side pin member 106 into a mill side coupling (coupling 102 having pin end 104 engaged therewith) and applying a specified torque. During make-up between the two, the mating surface 122 of the mill side seal 120 and the mating surface 132 of the field side seal 130 are configured to contact and compress, thereby completing the corrosion barrier along a full axial length of the connection. Axial compression provided may depend on the fluid pressure within the pipe to be sealed against. In general, the contact pressure of the seal may need not be greater than the fluid pressure. Therefore, depending on properties of the seal material, an axial interference may be provided to achieve suitable contact pressure in the seal, or an interference energized seal mechanism. The interference energized seal and pressure energized seal (described above) are configured to work together to provide complete sealing across the connection. Subsequently, the process of assembly may be repeated multiple times to assembly a full length downhole string having corrosion protection along a full length thereof.

Advantageously, embodiments of the present disclosure provide a corrosion resistant connection that may be used with standard couplings and pipe lengths. In addition, because the seals are permanently affixed within the pin ends, the connection is configured having no loose components that may be lost or misaligned during assembly. Rather, all seals are permanently fixed within the ends of the pipe lengths to be assembled prior to assembly. Overall, assembly costs and assembly time may be reduced using a connection in accordance with embodiments disclosed herein. Further, the connection provides a continuous corrosion resistant liner along a full length of the drillstring with a combination of the full length internal liners in the pipe lengths and the mating seals permanently affixed in the pipe ends, While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A threaded connection comprising:
   a first pipe having an internal liner and a first pin end on a distal end thereof, the first pin end comprising a first annular seal permanently affixed therein;
   a second pipe having an internal liner and a second pin end on a distal end thereof, the second pin end comprising a second annular seal permanently affixed therein; and
   a coupling comprising a first and second box end;
   wherein the first pin end and the first box end, and the second pin end and the second box end are threadedly engaged;
   wherein a mating surface of the first annular seal contacts a mating surface of the second annular seal at an angle to provide a continuous internal seal along an axial length of the threaded connection, and
   wherein the first annular seal comprises an annular groove formed on an inner surface of the first annular seal and extending in a radial direction such that the annular groove is in communication with the through-bore of the threaded connection to allow the first and second annular seals to axially compress under a load parallel to the central axis of the threaded connection.

2. The threaded connection of claim 1, wherein the first annular seal comprises:
   a planar annular section that is configured to contact an inner surface of the coupling;
   an annular back portion fixed to a similar annular surface provided on an end of the internal liner in the first pin end; and
   an end surface fixed to an inner surface of the internal liner in the first pin end.

3. The threaded connection of claim 1, wherein the second annular seal comprises:
   a planar annular section fixed to an inner surface of the second pin end;
   an annular back portion fixed to a similar annular surface provided on an end of the internal liner in the second pin end; and
   an end surface fixed to an inner surface of the internal liner in the second pin end.

4. The threaded connection of claim 1, further comprising an adhesive configured to secure the internal liner within the first and second pipes.

5. The threaded connection of claim 1, wherein the annular groove is proximate the mating surface of the first annular seal.

6. The threaded connection of claim 1, wherein a depth of the annular groove is between about 10% and 90% of a radial thickness of the first and second annular seals.

7. The threaded connection of claim 1, the annular groove comprising opposed flat surfaces having an angle therebetween of between about 10 and 80 degrees.

8. The threaded connection of claim 1, wherein the first annular seal and the second annular seal comprise a fiber reinforced polymer material.

9. The threaded connection of claim 1, wherein the mating surfaces are angled between about 10 and 90 degrees relative to a plane perpendicular to a central axis of the connection.

10. The threaded connection of claim 1, wherein the first and second seals are configured to axially compress at a final make-up of the threaded connection.

11. The threaded connection of claim 1, wherein the coupling comprises steel.

12. A method of assembling a threaded connection, the method comprising:

providing a first pipe having an internal liner and a first pin end on a distal end thereof, the first pin end comprising a first annular seal permanently affixed therein, the first annular seal comprising an annular groove formed on an inner surface of the first annular seal and extending in a radial direction such that the annular groove is in communication with the through-bore of the threaded connection;

providing a second pipe having an internal liner and a second pin end on a distal end thereof, the second pin end comprising a second annular seal permanently affixed therein;

providing a coupling comprising first and second box ends;

threadedly engaging the first pin end with the first box end, and the second pin end with the second box end, allowing the first and second annular seals to axially compress under a load parallel to the central axis of the threaded connection; and contacting a mating surface of the first annular seal with a mating surface of the second annular seal at an angle to provide a continuous internal seal along an axial length of the threaded connection.

13. The method of claim 12, further comprising axially compressing the first and second annular seals at a final make-up of the threaded connection.

14. The method of claim 12, wherein the internal liners of the first and second pipes are fiberglass.

15. The method of claim 12, wherein the first and second annular seals comprise fiber reinforced polymer material.

16. The method of claim 12, further comprising inserting the internal liner in the first and second pipes and pumping an adhesive between the internal liner and an inner surface of the first and second pipe.

17. The method of claim 12, further comprising pre-tensioning the internal liner and installing the pre-tensioned internal liner in the first and second pipe.

* * * * *